United States Patent [19]

Fahl

[11] Patent Number: 4,693,268

[45] Date of Patent: Sep. 15, 1987

[54] POPPET VALVE ASSEMBLY AND METHOD OF MAKING SAME

[75] Inventor: Richard L. Fahl, Fairfield, Ohio

[73] Assignee: Dover Corporation, New York, N.Y.

[21] Appl. No.: 813,250

[22] Filed: Dec. 24, 1985

[51] Int. Cl.[4] .................. F16K 1/12; F16K 31/52; F16K 35/02

[52] U.S. Cl. .................. 137/219; 137/614.06; 251/98; 251/259; 251/263

[58] Field of Search .................. 137/219, 614.06; 251/259, 263, 98, 99

[56] References Cited

U.S. PATENT DOCUMENTS

| | | | |
|---|---|---|---|
| 1,196,587 | 8/1916 | Robinson | 251/98 |
| 3,987,812 | 10/1976 | Nelson | 137/219 |
| 4,040,456 | 8/1977 | De Frees | 251/323 X |
| 4,126,294 | 11/1978 | De Frees | 251/99 |
| 4,313,590 | 2/1982 | Nishimiya | 251/323 X |

OTHER PUBLICATIONS

Emco-Wheaton F501 parts list.

Primary Examiner—Gerald A. Michalsky
Attorney, Agent, or Firm—Kinney & Schenk

[57] ABSTRACT

A poppet valve assembly and method of making same are provided and such assembly comprises a housing; a flow passage in the housing with the passage having a central axis and being adapted to flow a fluid in either direction therethrough; a poppet structure for controlling flow through the passage; a support structure for supporting the poppet structure during movement thereof along the axes; an actuator contact on the poppet structure between its head and stem to enable movement of the poppet structure along the axes; and apparatus for engaging the contact to provide the movement wherein the support structure comprises a cylindrical inside surface provided on the housing and having an axial length generally of the order of several times the particular diameter, and the support structure also comprises a cylindrical outside surface on the stem which slideably engages the inside surface, with the inside and outside surfaces cooperating and defining sole means confining the poppet structure against movements transverse the axes during movement of the poppet structure along the axes.

5 Claims, 13 Drawing Figures

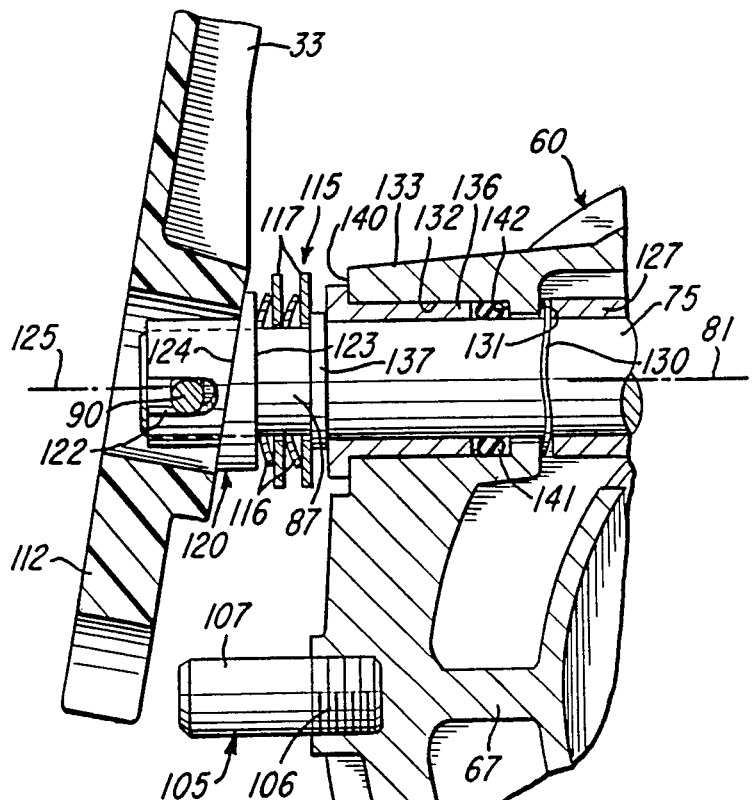
FIG-4
FIG-2
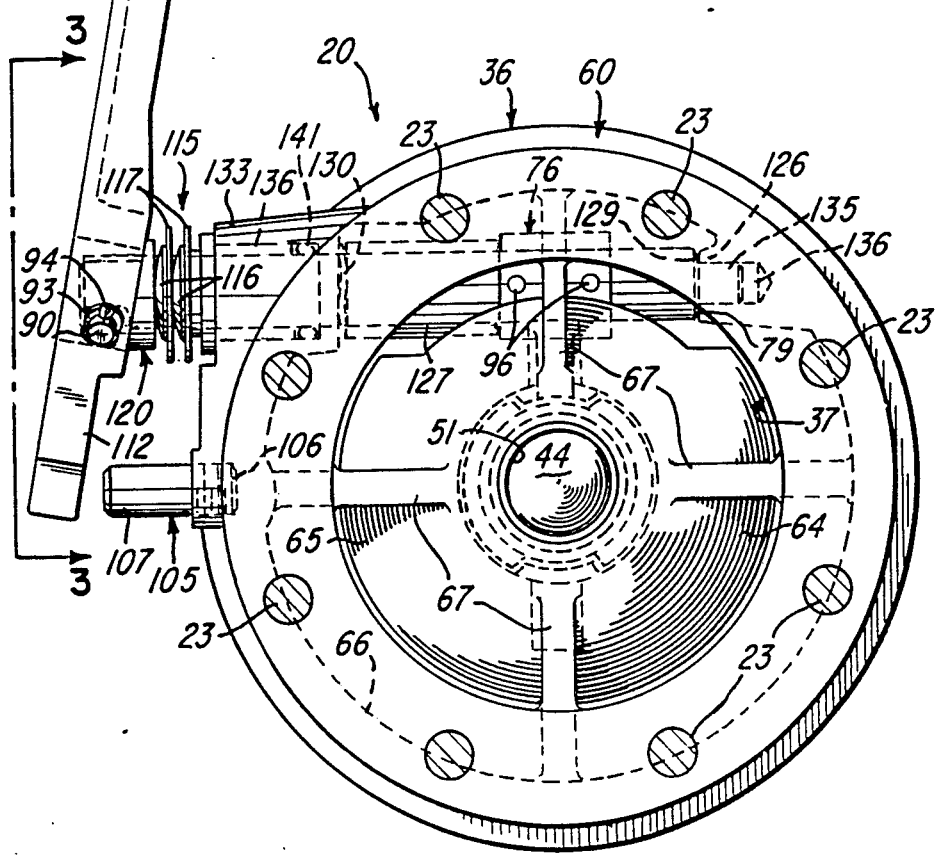

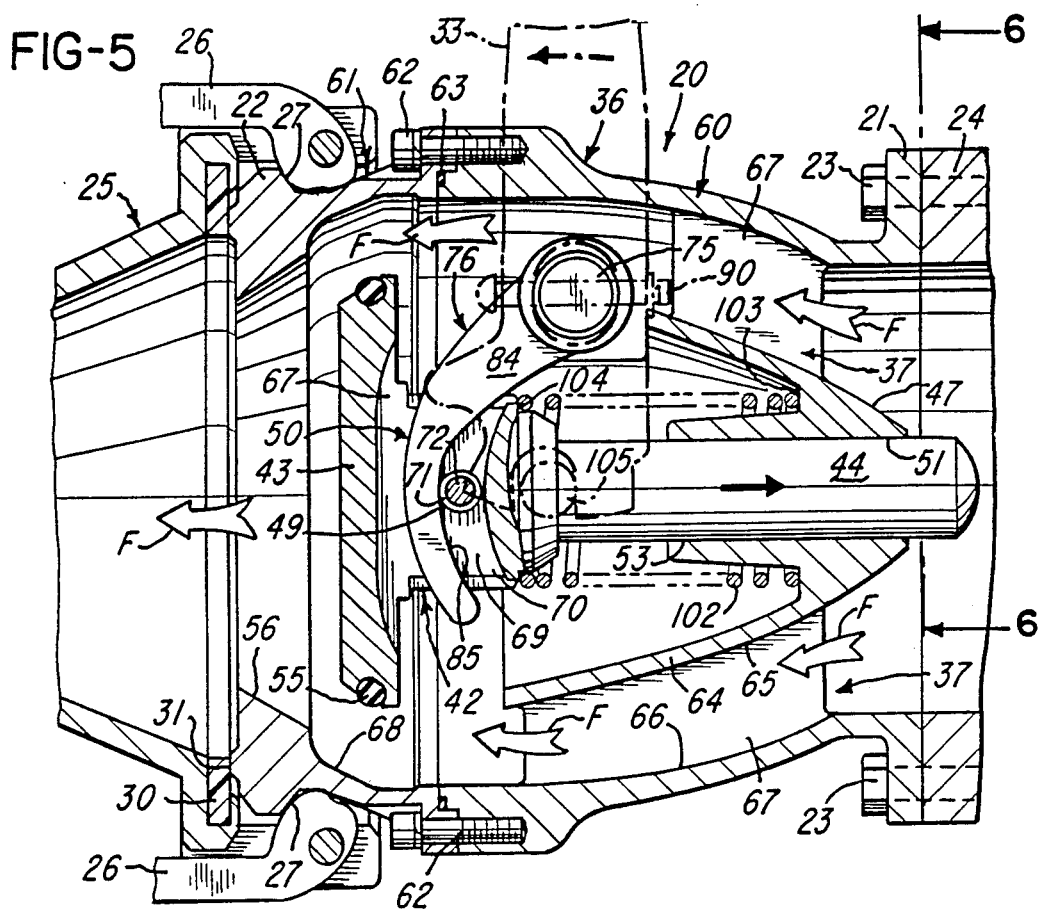
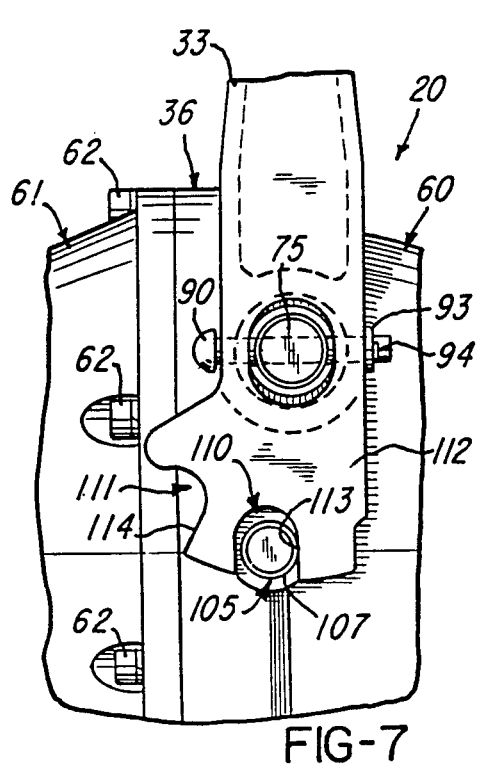
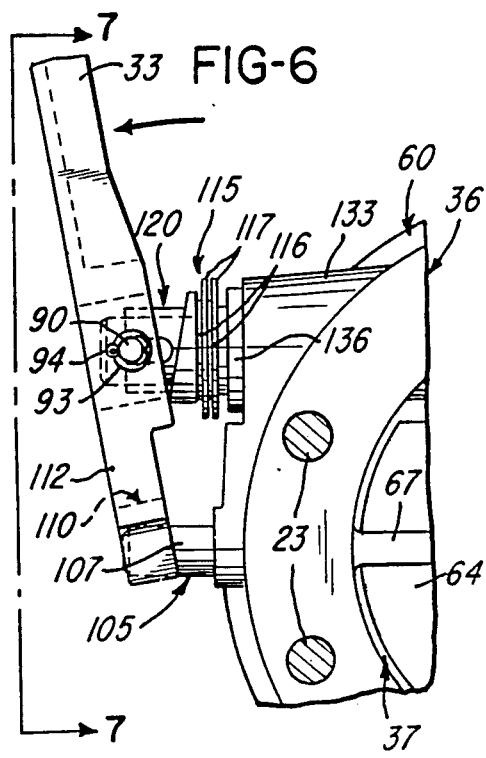

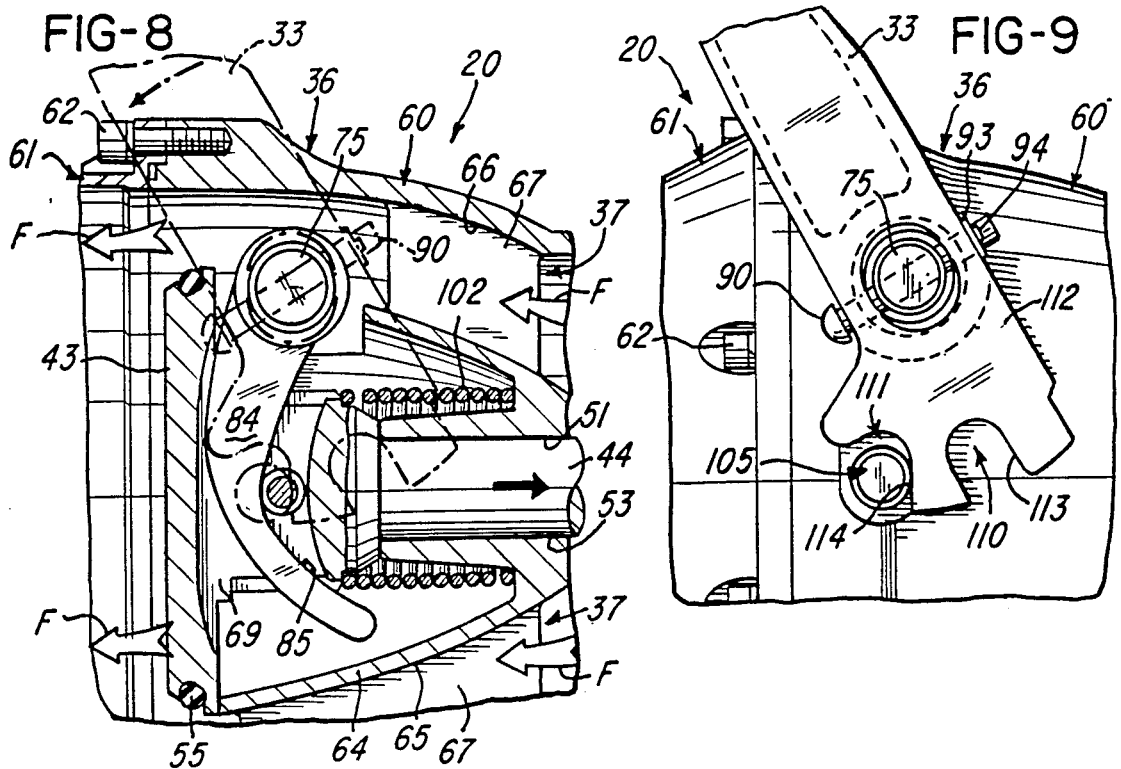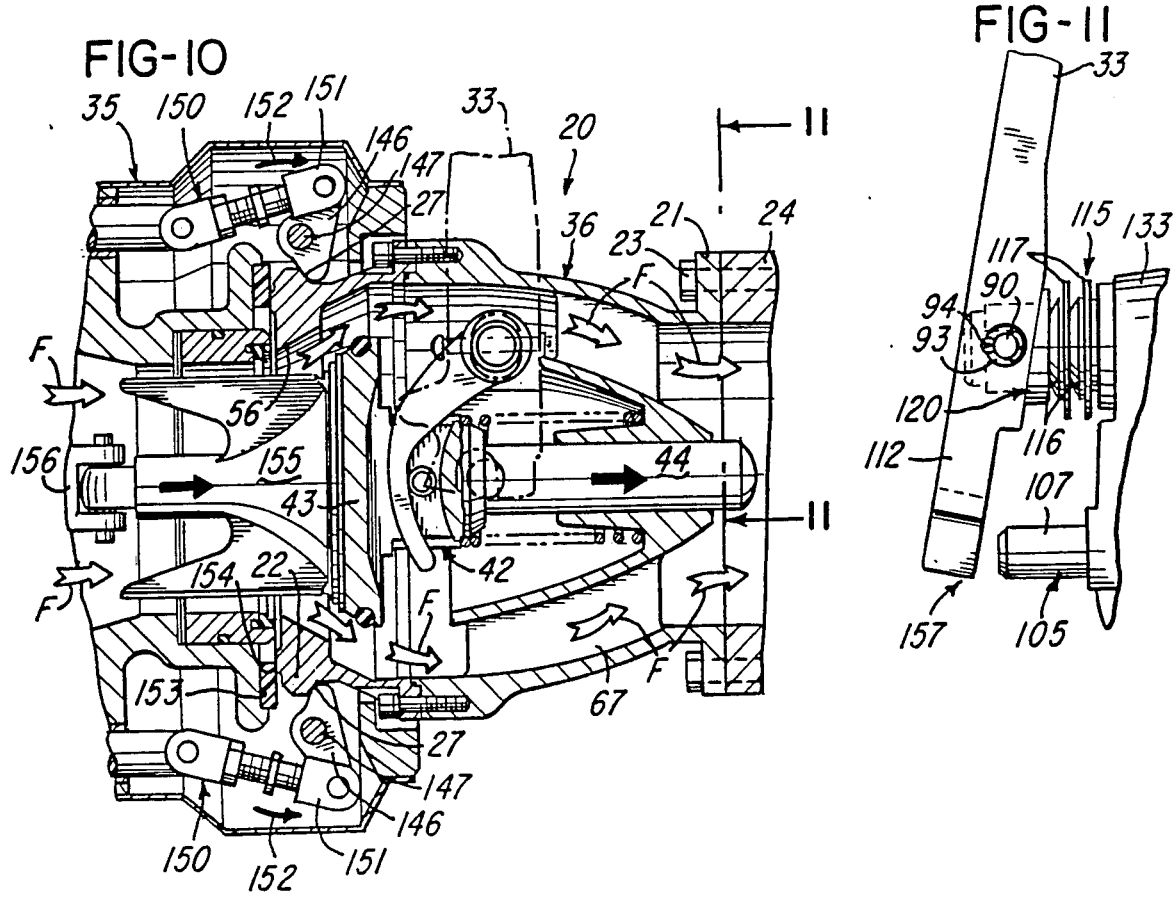

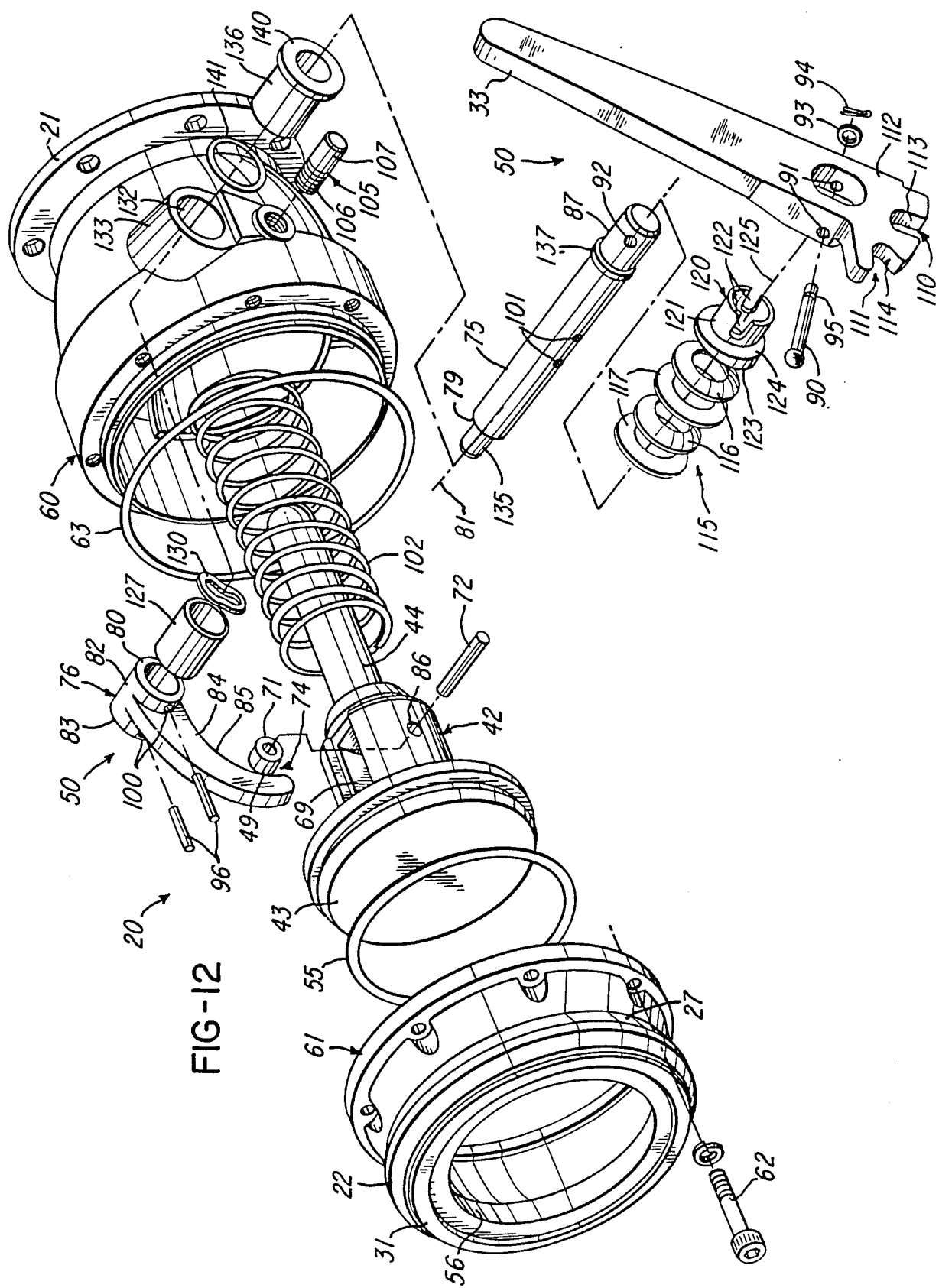

POPPET VALVE ASSEMBLY AND METHOD OF MAKING SAME

BACKGROUND OF THE INVENTION

1. Field of the Invention

This invention relates to a new poppet valve assembly for controlling flow therethrough of a fluid, such as gasoline, into a gasoline tank truck for filling same and out of such tank truck into an underground storage tank at a filling station, and the like, and to a new method of making such a poppet valve assembly.

2. Prior Art Statement

It is known in the art to provide a poppet valve assembly comprising; a housing; a flow passage in the housing with the passage having a central axis and being adapted to flow fluid in either direction therethrough; a poppet structure for controlling fluid flow through the passage with the poppet structure having a head, a cylindrical stem of a particular diameter, and a longitudinal axis which coincides with the central axis; means supporting the poppet structure during movement thereof along the axes; an actuator contact on the poppet structure between the head and stem to enable movement of the poppet structure along the axes; and means for engaging the contact to provide the said movement.

SUMMARY OF THE INVENTION

One feature of this invention is to provide a new supporting means for a poppet structure of a poppet valve of the character mentioned which allows free and unobstructed opening and closing movements of such poppet structure yet prevents movements thereof transverse the axis of the poppet structure.

In the known poppet valve assembly mentioned in the prior art statement the means provided for supporting the poppet structure during movement thereof along its axis and the flow axis of its associated flow passage consists of guides in the housing associated with the poppet structure and such guides are expensive to provide and difficult to manufacture with the required precision.

However, it has been found in accordance with the teachings of this invention that supporting means for a poppet structure of a poppet valve of the character mentioned may be in the form of a cylindrical inside surface provided on the housing for the poppet valve with such cylindrical inside surface having an axis extending coaxially with the axis of the poppet structure and its flow passage and with such inside surface having an axial length generally of the order of several times the diameter of the stem of the poppet structure and with the supporting means further comprising a cylindrical outside surface on such stem which slideably engages the inside surface and with the inside and outside surfaces cooperating and defining sole means confining the poppet structure against movements transverse the axes during movement of the poppet structure along said axes.

In particular, one embodiment of this invention provides a poppet valve assembly comprising; a housing; a flow passage in said housing with the passage having a central axis and being adapted to flow fluid in either direction therethrough; a poppet structure for controling fluid flowing through the passage with the poppet structure having a head, a cylindrical stem of a particular diameter, and a longitudinal axis which coincides with the central axis; means supporting the poppet structure during movement thereof along the axes; an actuator contact on the poppet structure between the head and the stem to enable movement of the poppet structure along the axes; and means for engaging said contact to provide said movement; with the supporting means comprising a cylindrical inside surface provided on the housing and having an axis extending coaxially with the axes and having an axial length generally of the order of several times the particular diameter, and the supporting means further comprising a cylindrical outside surface on the stem which slideably engages the inside surface, with the inside and outside surfaces cooperating and defining sole means confining the poppet structure against movements transverse said axes during movement of said poppet structure along said axes.

Another feature of this invention is to provide a new poppet valve assembly which has unique means for engaging a contact on a poppet structure to provide movement between its closed and open positions.

It has also been found that in the known poppet valve assembly mentioned in the prior art statement the means provided for engaging a contact on a poppet structure to provide movement of such poppet structure from its closed to open positions consists of a shaft carried by the valve assembly housing for rotary movements thereof and an actuator detachably fastened to the shaft and wherein the shaft is held in position by an ordinary retaining ring which does not provide optimum results. In addition, in such known poppet valve assembly a comparatively complex operating handle, and associated structure, are required.

However, it has been found according to the teachings of this invention that the means for engaging a contact on a poppet structure to provide movement of such poppet structure may be in the form of a shaft carried by the valve assembly housing for rotary movements thereof and an actuator detachably fastened to the shaft with the shaft and actuator having outer annular surfaces which together define the sole means engaging structural portions associated with its associated valve assembly housing to hold the shaft and actuator against movements parallel to a central axis of the shaft while allowing the rotary movements of the shaft to enable the actuator to engage with the said contact.

Thus, in accordance with another embodiment of this invention a poppet valve assembly is provided which comprises a housing; a flow passage in the housing with the passage having a central axis and being adapted to flow fluid in either direction therethrough; a poppet structure for controlling fluid flow through the passage with the poppet structure having a head, a cylindrical stem of a particular diameter, and a longitudinal axis which coincides with the central axis; means supporting the poppet structure during movement thereof along the axes; an actuator contact on the poppet structure between the head and the stem to enable movement of the poppet structure along the axes; and means for engaging the contact to provide the said movement wherein the engaging means comprises a shaft carried by said housing for rotary movements thereof and an actuator detachably fastened to said shaft, with the shaft and actuator having outer annular surfaces which together define the sole means engaging structural portions associated with said housing to hold said shaft and actuator against movements parallel to a central axis of said shaft while allowing said rotary movements of said shaft to enable said actuator to engage said contact.

Accordingly, it is an object of this invention to provide a new poppet valve assembly having one or more of the novel features of this invention as set forth above or hereinafter shown or described.

Another object of this invention is to provide a new method of making such a poppet valve assembly, the method of this invention having one or more of the novel features of this invention as set forth above or hereinafter shown or described.

Other features, objects, uses, and advantages of this invention are apparent from a reading of this description which proceeds with reference to the accompanying drawings forming a part thereof.

BRIEF DESCRIPTION OF THE DRAWINGS

The accompanying drawings show present preferred embodiments of this invention, in which FIG. 1 is a view with parts in cross section, parts in elevation, parts shown in dotted lines, and parts broken away illustrating one exemplary embodiment of a poppet valve assembly of this invention with one end of such valve assembly installed on a flange of a gasoline tank truck and with the valve assembly being shown in its closed position; and, such valve assembly has an unload coupler coupled thereto at its opposite end for flow of gasoline from the tank truck through the valve assembly and unload coupler into a gasoline storage tank, or the like;

FIG. 2 is a view taken essentially on the line 2—2 of FIG. 1;

FIG. 4 is an enlarged fragmentary view of the upper left-hand portion of FIG. 2 particularly illustrating a handle used to open and close the poppet valve assembly and certain structure associated with such handle;

FIG. 5 is a view similar to FIG. 1 showing the poppet valve assembly in a partially open unloading position;

FIG. 6 is a view taken essentially on the line 6—6 of FIG. 5;

FIG. 7 is a view taken essentially on the line 7—7 of FIG. 6;

FIG. 8 is a view similar to the central portion of FIG. 5 showing the poppet valve assembly in a fully open unload position;

FIG. 9 is a view similar to FIG. 7 showing the lower portion of the handle and an associated stop in the valve assembly position of FIG. 8 with the showing in FIG. 9 being similar to the showing in FIG. 7;

FIG. 10 is a view of the poppet valve assembly with its one end installed on the flange of a gasoline tank truck but with a load coupler being coupled thereto at its opposite end, and showing the loading of gasoline through the valve assembly into the tank of the tank truck;

FIG. 11 is a view taken essentially on the line 11—11 of FIG. 10; and

FIG. 12 is an exploded isometric view of the poppet valve assembly of FIG. 1.

DESCRIPTION OF PREFERRED EMBODIMENTS

Figure 1A:
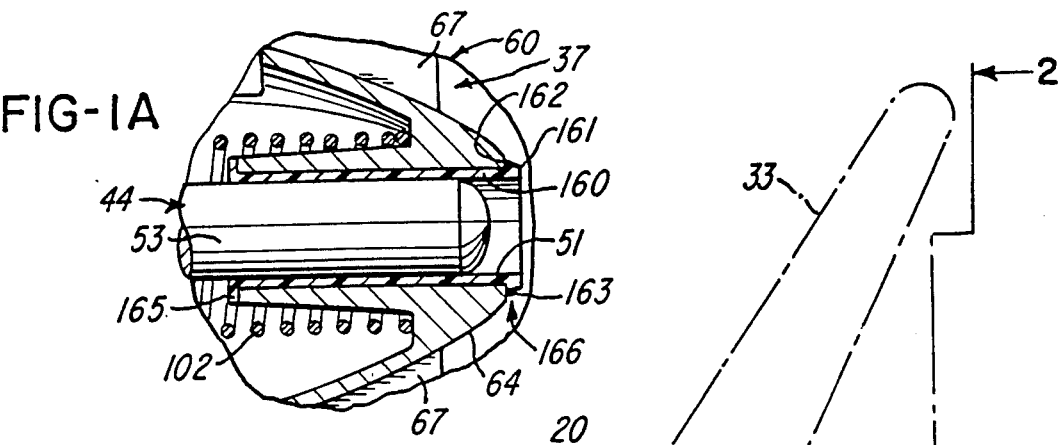
FIG. 1A is a modification of the valve assembly of FIG. 1.

While the various features of this invention are hereinafter illustrated and described as being particularly adapted to provide a poppet valve assembly for use with tank truck equipment in dispensing and flowing gasoline and the like therethrough in a manner known in the art, it is to be understood that the various features of this invention can be utilized singly or in various combinations thereof to provide poppet valve assemblies for dispensing other fluids and in other applications, as desired.

Therefore, this invention is not to be limited to only the embodiments illustrated in the drawings, because the drawings are merely utilized to illustrates one of the wide variety of uses of this invention.

Figure 1:
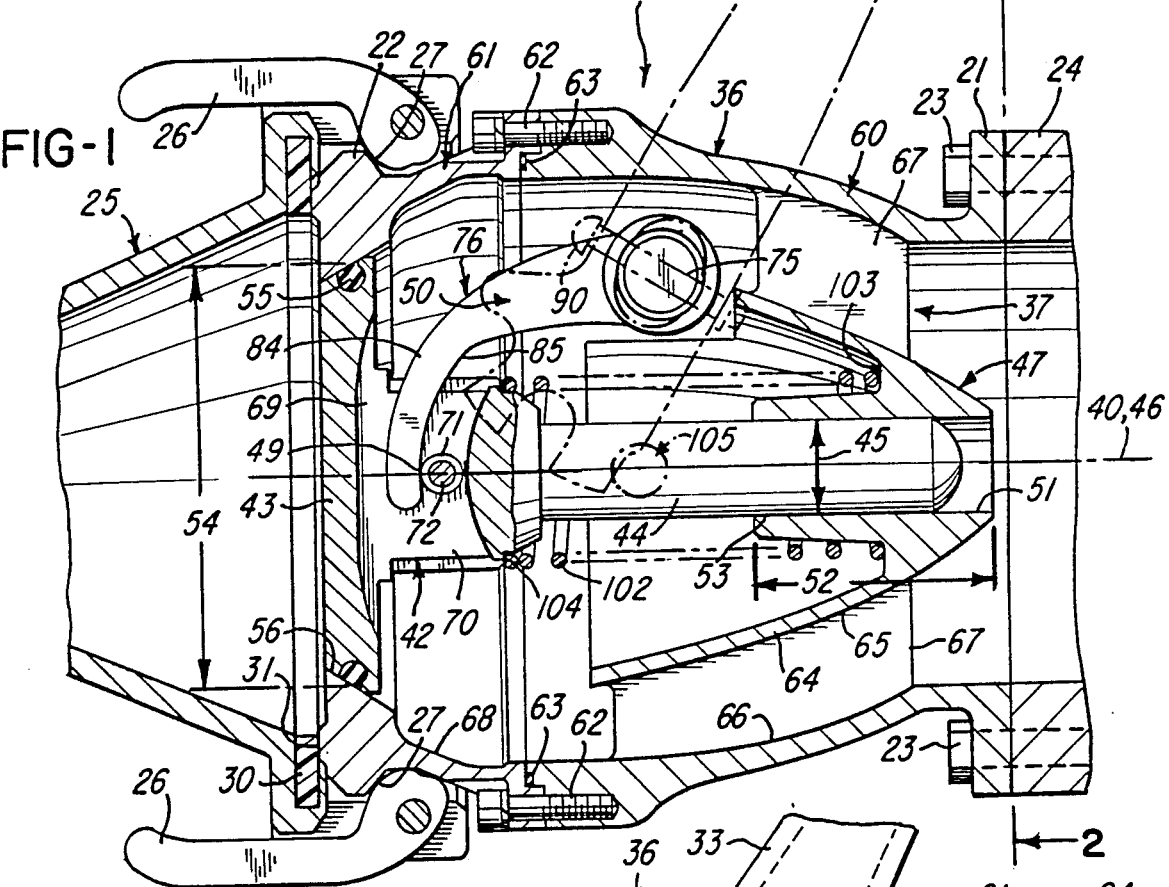
Figure 3:
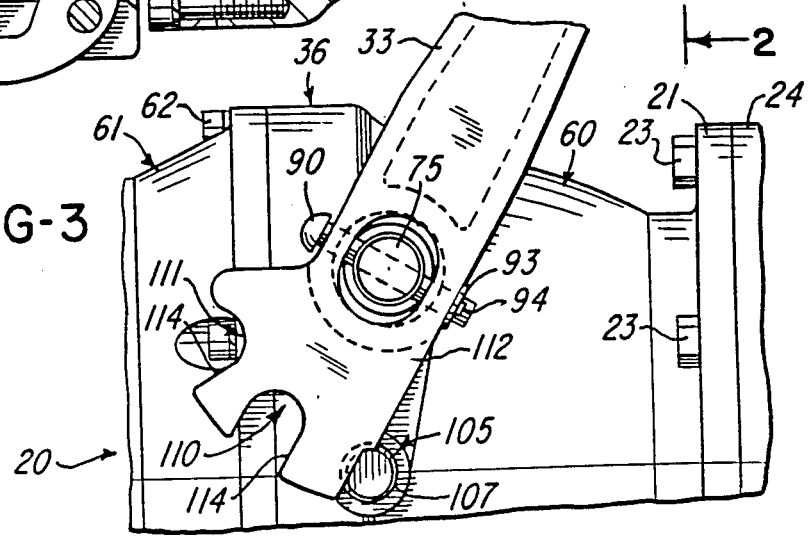
FIG. 3 is a view taken essentially on the line 3—3 of FIG. 2.

Reference is now made to FIG. 1 of the drawings which illustrates one exemplary embodiment of a poppet valve assembly of this invention which is designated generally by the reference numeral 20. The valve assembly 20 is particularly adapted to be used with tank truck equipment such as gasoline tank trucks used to haul gasoline to a gasoline service station for motor vehicles such as automobiles, trucks, and the like.

The valve assembly 20 has a flange end terminating in a flange 21 defining one end thereof and an adapter end terminating in an adapter flange 22 at its opposite end. The flange 21 is particularly adapted to be fastened by a plurality of threaded bolts 23 to a truck flange 24 provided on a gasoline tank truck (not shown) and the truck flange 24 is in fluid flow communication, in a manner known in the art, with a gasoline tank of such tank truck to enable gasoline from within the tank to flow through the valve assembly upon opening thereof and as will be described in more detail subsequently.

The adapter flange 22 is particularly adapted to have a so-called unload coupler 25, of any suitable type known in the art, detachably fastened thereto by a plurality of cam levers 26 having clamping ends which engage an annular surface 27 on the adapter flange 22 and hold the unload coupler 25 so that an annular gasket seal 30 thereof is in fluid-tight engagement against an annular planar end surface 31 of the adapter flange 22. With the unload coupler 25 fastened in sealed relation with its seal 30 against annular surface 31 the valve assembly 20 is opened utilizing a manually operated actuating handle 33 thereof to thereby enable a fluid, such as gasoline, to flow from the tank in the tank truck through the truck flange 21, valve assembly 20, unload coupler 25, and into an underground gasoline storage tank of the type utilized at a gasoline filling station and as is known in the art. The adapter flange 22 is also particularly adapted to have a so-called load coupler, which is designated generally by the reference numeral 35 in FIG. 10 of the drawings, detachably fastened thereto and such load coupler 35 will be described in more detail subsequently.

The valve assembly 20 comprises a housing which is designated generally by the reference numeral 36 and a flow passage in the form of a substantially annular flow passage 37 is provided through the housing and such passage has a central axis 40. The flow passage 37 is adapted to flow fluid such as gasoline in either direction therethrough. In particular, when utilizing the valve assembly 20 with unload coupler 25 fluid flow is from right to left as shown in FIG. 5; and, when utilizing the valve assembly 20 in connection with load coupler 35 fluid flow is from left to right as shown in FIG. 10.

The valve assembly 20 comprises a poppet structure which is designated generally by the reference numeral 42 in FIGS. 1 and 12, and such poppet structure is provided for controlling fluid flow through the passage 37.

The poppet structure 42 has a poppet head 43, a cylindrical stem 44 of a particular diameter 45, and a longitudinal axis 46 which coincides with the central axis 40.

The valve assembly 20 also has means, designated generally by the reference numeral 47 in FIG. 1, supporting the poppet structure 42 during movement thereof along the coinciding axes 40 and 46; and, the valve assembly 20 has an actuator contact 49 on the poppet structure between the head 43 and stem 44 thereof to enable movement of the poppet structure 42 along the axes 40 and 46. The valve assembly 20 also has engaging means 50 for engaging the contact 49 to provide the said movement of the poppet structure 42 and such engaging means 50 will be described in more detail subsequently.

In accordance with the teachings of this invention the supporting means 47 of the valve assembly 20 comprises a cylindrical inside surface 51 provided on the housing 36 and such cylindrical inside surface 51 has an axis which extends coaxially and coincides with the axes 40 and 46 and such surface 51 has an axial length 52 which is generally of the order of several times the particular diameter 45 of the stem 44. The supporting means 47 also comprises a cylindrical outside surface 53 on the stem 44 and the surface 53 slideably engages the cylindrical inside surface 51. The inside and outside surfaces 51 and 53 respectively cooperate and define the sole means confining the poppet structure against movements transverse the axes 40 and 46 during movement of the poppet structure 42 along such axes.

As will be readily apparent from FIG. 1 of the drawings the particular diameter 45 is large when compared to the effective diameter 54 of the poppet head 43 and such effective diameter 54 is shown as the median diameter of an O-ring seal 55 carried by the poppet head 44 and as such seal engages a frustoconical inside surface 56 of the adapter flange 22. The large diameter 45 assures that movement of the poppet structure 42 along the axes 40 and 46 is free of tilting movements transverse such axes. In this exemplary embodiment of the invention the effective diameter 54 is preferably no more than five times greater than the particular diameter 45.

Reference is now made, for convenience in the placing of reference numerals on the drawings, to FIG. 5 of such drawings and it is seen that the housing 36 is comprised of a plurality of two component housing parts shown as parts 60 and 61. The cylindrical inside surface 51 is provided on the part 60 and the parts 60 and 61 are held together by a plurality of threaded bolts 62. An annular O-ring seal 63 is disposed in a stepped annular groove at the inner end of part 60 and the seal 63 provides a fluid-tight seal between parts 60 and 61. As will be readily apparent from the drawings the housing part 60 has the flange 21 defined at its outer end while the housing part 61 has the adapter flange 22 defined at its outer end.

The housing part 60 also has an integral deflector 64 (FIG. 5) which has a substantially frustoconical or bulletnosed configuration provided with an outside surface 65, and the deflector surrounds the inside surface 51. The outside surface 65 of deflector 64 defines one wall of the annular passage 37 through the housing part 60 and the outer wall of that portion of the annular passage 37 associated with the housing part 60 is defined by an inside surface portion 66 of the housing part 60. It will also be seen from FIG. 2 of the drawings that the integral deflector 64 has a plurality of four integral ribs 67 extending between such deflector and the inside surface 66 of the housing part 60. The portion of the annular passage 37 through the housing part 61, once the poppet structure 42 is partially or fully open, is defined by outer surface portions of the head portion of structure 42 and an inside surface 68 in part 61, as shown in FIG. 5.

The poppet structure 42 of the valve assembly 20 is preferably in the form of a single-piece structure; and, such structure has an opening 69 defined therein and as best seen in FIG. 12 of the drawings. The opening 69 is preferably provided in a transition portion 70 of poppet structure 42 between the poppet head 43 and the poppet stem 44. The valve assembly 20 has a roller 71 rotatably supported by the poppet structure 42 within the opening 69 on a pin 72 which is suitably held in position in the poppet structure 42 as will be described subsequently. The roller 71 has an axis of rotation which is coplanar with the axes 40 and 46 and the contact 49 is defined by the outside surface of the roller and as also seen at 74 in FIG. 12.

As previously mentioned the valve assembly 20 has means 50 (FIGS. 1 and 12) for engaging the contact 49 to provide movement of the poppet structure 42 along the axes 40 and 46. As best seen in FIG. 12 the engaging means 50 comprises a shaft 75 carried by the housing 36 and in particular carried by part 60 of housing 36 for rotary movements thereof and an actuator 76 detachably fastened to the shaft 75.

The shaft 75 and actuator 76 have outer annular surfaces 79 and 80 respectively which together define the sole means engaging structural portions associated with the housing 36 to hold the shaft 75 and actuator 76 against movements parallel to the central axis 81 of the shaft 75 while allowing rotary movements of the shaft 75 to enable the actuator 76 to engage the contact 49 defined by the outside surface 49 of roller 71.

The actuator 76 has a tubular body or hub portion 82 and annular edge 80 defines one end edge of the hub portion 82 while an end edge 83 defines the opposite end edge. The actuator 76 also has an actuating cam finger portion 84 and such cam finger has a precision computer-generated cam surfaces 85 which engages the contact 49 and provides actuating forces only along the axes 40 and 46 throughout the entire actuating range of the actuator 76 and cam surface 85. It will be appreciated that the entire actuating range of the actuator 76 consists entirely of pivoting movements i.e., partial rotary movements which are imparted to the shaft 75 by the actuating handle 33 in a manner to be described in detail subsequently.

The cam surface 85 is made utilizing the latest state-of-the-art computer equipment; and, basically surface 85 is defined by what may be considered an infinite number of points which represent a corresponding number of rotary positions of the cam finger 84 such that at each position of cam finger 84 the force applied by the cam surface 85 against contact 49 is a force which tends to open the poppet structure 42 and is coaxial with the axes 40 and 46.

As previously mentioned the roller 71 is held in position in the opening 69 of the poppet structure 42 by pin 72. The pin may be of any suitable type and thus of a type which is press-fitted in position within associated aligned openings 86 in the poppet structure 42. The pin may also be of a type which has tubular end portions which are particularly adapted for insertion of a flaring tool therein so that once such end portions are inserted in the aligned openings 86 the tubular end portions may be flared to thereby hold the pin 72 and roller 71 in position.

Reference is again made to FIG. 12 of the drawings which shows in isometric view the previously mentioned actuating handle 33 and associated structure and such handle and structure also comprise the engaging means 50. The handle 33 is attached to an outer end 87 of the shaft 75 by a pivot pin 90 which extends through a pair of aligned openings 91 in such handle and a cooperating opening 92 in the end 87 of shaft 75. Once the pivot pin 90 is extended through the openings 91 and 92 a washer 93 is placed in position around the forward end of pin 90 and a spring clip 94 is provided and disposed in a known manner therearound in an annular groove 95 in such forward end of the pin 90 to thereby hold such pin in position and thereby hold the handle 33 on the end of the shaft 75. The handle 33 is used to provide manual rotary movements of the shaft 75 and hence the actuator 76 fastened thereto. Thus, components 33, 75, and 76 define the major components of the engaging means 50.

As previously mentioned the actuator 76 is detachably fastened to the shaft 75 and the means providing such detachable fastening is in the form of pin means shown as a pair of pins each designated by the same reference numeral 96. Each pin 96 extends through an associated bore 100 in the hub portion of the actuator 76 and through an associated bore 101 in the shaft 75 so that once the pins 96 are extended through bores 100 and 101 the actuator 76 is detachably fastened to the shaft 75.

The valve assembly 20 is a normally closed valve assembly which is kept closed by a mechanical compression spring 102 as seen in FIG. 1. The spring 102 acts between an annular surface 103 (FIG. 5) in the housing part 60 of the housing 36 and an annular ledge 104 in the transition portion 70 of the poppet structure 42 to thereby continuously yieldingly urge the poppet structure and in particular the poppet head 43 of such structure toward its closed position so that in such closed position the O-ring seal 55 is in sealed relation against the sealing surface 56 of the adapter flange 22.

The valve assembly 20 is used during unloading operations with the unload coupler 25 attached in position. The handle 33 is then manually rotated to override the compression spring 102 through the action of actuator 76 to thereby allow fluid flow from right to left as shown in FIG. 5 and thereby enable fluid flow from a tank of a tank truck through the valve assembly 20 and through the unload coupler 25. The valve position of FIG. 5 is a partially open position; however, the valve assembly 20 may be opened, utilizing the handle 33, to a plurality of open positions and for this purpose a stop 105 is provided on the valve assembly 20.

The stop 105 is best seen in FIG. 12 and such stop 105 has a threaded end 106 which is threadedly received within a cooperating threaded portion of the housing part 60. The stop 105 also has a smooth rod-like outer portion 107 which is particularly adapted to be engaged by the handle 33, as will now be described.

For the purpose of holding handle 33 and hence valve assembly 20 in a plurality of open positions the handle has recess means shown in this example as a plurality of two cutouts or recesses 110 and 111 which are defined in an inner end portion 112 of such handle. The two recesses 110 and 111 define a corresponding plurality of two holding surfaces 113 and 114 on the inner end portion 112.

In this example, the two recesses 110 and 111 enable the valve assembly 20 to be held in two open positions. In particular, the recess 110 with its holding surface 113 enable holding of the valve assembly 20 in the partially open unload position illustrated in FIGS. 5, 6 and 7. The recess 111 with its holding surface 115 enable holding of the valve assembly 20 in the fully open unload position illustrated in FIGS. 8 and 9.

Referring again to FIG. 12 of the drawings it is seen that the handle 33 has means 115 normally yieldingly urging the holding surfaces 113 and 114 away from the stop 105 and in particular away from the surface 107 of such stop whereby with the holding surfaces 113 and 114 urged away from stop 105 the poppet structure 42 and hence the valve assembly 20 are held closed by spring 102.

As previously mentioned the pin 90 is provided for attaching the handle 33 to the end 87 of the shaft 75 while allowing pivoting movements of such handle about pin 90. The urging means 115 previously mentioned comprises spring means in the form of a plurality of cupped spring washers 116 cooperating with a plurality of flat washers 117, and a hub member 120 carried concentrically around the shaft 75 adjacent the end 87 thereof. The hub member 120 has a tubular end 121 and a transverse slot means 122 is provided in the end 121. The urging means 115 is installed on the shaft 75 and the pin 90 extends through slot means 122 of the hub member 121 whereby such member cannot rotate relative to the shaft 75. The hub member 120 has a hub axis 125 which coincides with the axis 81 of the shaft 75 and such member 120 comprises a first annular surface 123 disposed in a first plane which is perpendicular to the hub axis 125 and a second annular surface 124 disposed in a second plane which is at an angle to the hub axis 125. The second annular surface or angled surface 124 engages the handle 33 and serves to hold such handle with its holding surfaces 113 and 114 away from the stop 105 due to the action of the spring means 115 urging the hub member 120, i.e. angled surface 124 of member 120, against the handle and thereby causing pivoting movement of the inner end portion 112 of the handle away from the stop 105.

With the above-described action by the urging means 115, the handle 33 is always urged so that the holding surfaces 113 and 114 thereof are away from the stop 105 unless such surfaces are physically placed against such stop by an operator. Thus, the handle 33 is ineffective to hold the shaft 75 in any particular position unless a valve operator overrides the spring 102. If an operator does not override spring 102 the valve assembly 20 is always in its closed position.

To partially open the valve assembly 20 from its closed position to the position shown in FIGS. 5, 6 and 7 the handle 33 is grasped by an operator and rotated so that recess 110 is aligned opposite the stop 105 whereupon the handle is pivoted about its pivot pin 90 so that the outer portion of the handle 33 is normally moved toward the operator and the holding surface 113 is engaged against surface 107 of the stop 105. In this position, fluid flow through the valve assembly 20 is from right to left, essentially as shown by the arrows F in FIG. 5.

To fully open the valve assembly 20 from the partially open position of FIG. 5, the operator grasps the outer end of the handle 33 and first pivots such outer end about pivot pin 90 until the holding surface 113 is moved away from pin 105. The operator then continues rotation of handle 33 until the recess 111 thereof is aligned with the stop pin 105 whereupon the handle is again pivoted about the pivot pin 90 until the holding surface 114 engages the stop 105 to thereby hold the valve assembly 20 in its fully open position, which is the position illustrated in FIGS. 8 and 9. It will be appreciated that flow of fluid in such fully open position is also from right to left as shown by the flow arrows F in FIG. 8. It will be appreciated that in each instance that the handle 33 is actuated to rotate the shaft 75 forces are transmitted through the hub portion 83 of actuator 76 to its finger portion 84 and in turn to roller 71 by means of cam surfaces 85 to thereby override the compression spring 102. Once the valve assembly 20 has been either partially opened or fully opened, the force required to keep the spring compressed acts back through the system and through either holding surface 113 or 114 against the stop 105 and in particular surface 107 of such stop and such force is sufficient that the frictional contact between either surface 113 or 114 and stop 105 is sufficient to hold the lever against the stop even with the urging means tending to urge portion 112 away from the stop 105.

As previously mentioned the engaging means 50 comprises the shaft 75 and the actuataor 76 and such shaft and actuator have outer annular surfaces 79 and 80 respectively which together define the sole means engaging structural portions associated with the housing to hold the shaft and actuator against movements parallel to the central axis 81 of the shaft while allowing rotary movements of the shaft to enable the actuator 76 to engage the contact 49. The structural portions associated with the housing 36 referred to consist of an annular surface 129 (FIG. 2) provided on a portion 126 of part 60 of housing 36 and other strucutural portions comprising a tubular member 127 and a wavy spring member 130 which are disposed concentrically around the shaft 75. The spring member 130 is sandwiched between an annular surface 131 (FIG. 4) on housing part 60 of housing 36 and tubular member 127 once the actuator 76 is installed in position on shaft 75.

The actuator 76 is readily installed on the shaft 75 using the structure of this invention and such shaft 75 and actuator are held against movements parallel to the central axis 81 of such shaft. The housing part 60 has a bore 132 in an integral boss 133 thereof. It is a comparatively simple matter to install and hold the poppet structure 42 in position by compressing spring 102. After disposing members 136 and 141 thereon, the shaft 75 is then partially inserted through bore 132 and actuator 76, member 127, and spring washer 130 disposed therearound. A reduced diameter portion 135 of shaft 75 is then disposed in a bore 136 (FIG. 2) in housing part 60 so that annular surface 79 is disposed adjacent surface 129. Finger portion 84 of actuator 76 is disposed in opening 69. The outer end of shaft 75 is then held against axial movement and hub portion 82 is positioned axially until bores 100 therein are aligned with the bores 101 in the shaft 75 whereupon the pins 96 are installed in position. The construction and arrangement of parts are such that once the hub portion is pinned in position by pins 96 of the shaft 75 and actuator 76 are effectively held axially solely by annular surface 79 engaging annular surface 129 and annular surface 80 engaging member 127 which is held axially in position by spring member 130 engaging the surface 131 previously described. The pins 96 are easy to install in position, particularly with housing 36 being in two parts.

As seen in FIG. 12, the valve assembly 20 also has the previously mentioned member 136 which is a tubular flanged collar 136 disposed around the outer end portion of the shaft 75. The flanged collar 136 is held in position by an integral annular projection 137 provided on the shaft and which engages the outer surface 140 on the flange portion of collar 136. Member 141 is an O-ring seal 141 provided so that it is disposed between the inner end edge of the collar 136 and an annular surface 142 provided adjoining the inner end edge of the cylindrical bore 132 in the boss 133.

In using the valve assembly 20 of this invention an operator would normally manually actuate such assembly by the handle 33 so that the handle would be closer to the operator than the remainder of the valve assembly. Should the operator, for any reason, lose his grasp of the handle 33 the urging means 115 will operate such that the outer portion of such handle will be urged away from the operator and thus not tend to whip such operator.

As mentioned earlier, to open the valve assembly 20 the compression spring 102, which normally holds the poppet structure 42 closed, is overrriden by the finger portion 84 of cam actuator 76 engaging contact 49 on the roller 71 whereupon the poppet structure 42 is moved so that the poppet head 43 and its O-ring seal 55 are moved away from sealing surface 56 of the adapter flange 22. In the partially open position of FIG. 5 the movement of the poppet structure is partial and in the fully open position of FIG. 8 the movement of the poppet structure is substantially the maximum possible opening movement thereof.

As previously indicated the poppet valve assembly 20 may also be used to load a fluid, such as gasoline, in a tank truck. In this mode of operation instead of fluid flow being from right to left as shown in FIGS. 5 and 8, fluid flow if from left to right as shown in FIG. 10. To use the valve assembly 20 as a loading valve a load coupler is detachably fastened to the adapter flange 22 as will now be described.

The load coupler 35 is basically a standard coupler of a type known in the art and does not comprise any part of this invention. The load coupler has a pair of pivoted cam arms or cams 146 which are pivoted on associated pivot pins 147 and the cam arms 146 are actuated by a pair of associated linkage assemblies 150. The linkage assemblies 150 are connected to a common shaft (not shown) which is in turn rotated by a manually operated handle (also not shown) so that upon rotating the handle in one direction a pair of links 151 of the linkage assemblies 150 are moved to the right as shown by the arrows 152 in FIG. 10 causing the cam arms 146 to be pivoted about their pivot pins 146 whereby the working ends of such cam arms engage annular surface 27 of the adapter flange and clamp the load coupler 35 in position thereagainst. During this clamping action an annular gasket seal 153 comprising the load coupler 35 engages a planar annular outside surface 154 on the adapter flange 22 to provide a fluid-tight seal between the load coupler 35 and the valve assembly 20.

The above-mentioned load coupler handle that is moved to thereby move the linkage assembly 150 and thus move links 151 which provide a locking of the cam arms 146 also simultaneously opens a poppet 155 of the load coupler 35 and the construction and arrangement of such load coupler is such that movement of its poppet 155 does not occur until the gasket seal 153 provides the above-mentioned seal between the load coupler 35 and valve assembly. The poppet 155 is connected to the load coupler handle by a suitable linkage 156 of which only the forward end thereof is shown in FIG. 10.

Once the load coupler 35 is coupled in sealed relation to the valve assembly 20 the poppet 155 engages the poppet head 43 thereby overriding the compression spring 102 and moving the poppet head 43 away from surface 56 of the adapter flange 22. This movement of the poppets allows flow of fluid which is in a supply tank associated with the load coupler 35 to flow from left to right, as indicated by arrows F in FIG. 10, and thus through the valve assembly 20 and into the tank of the tank truck.

During the loading operation shown in FIG. 10, the handle 33 is yieldingly urged by urging means 115 so that its lower or inner portion 112 is away from the stop 105, as shown at 157 in FIG. 11. Because the handle 33 is operatively connected through contact 49 of roller 71, actuator 76, and shaft 75 to the poppet structure, the handle 33 is simply rotated to whatever position the poppet structure 42 is moved by the poppet 155 during the loading operation. In essence, the handle 33 simply goes along for the ride during a loading operation.

As mentioned above, the handle 33 is yieldingly urged by the urging means 115 so that its inner end portion 112 is kept away from the stop 105. This assures that the handle 33 will not obstruct opening movement of the poppet structure 42 during a loading operation. Once the load coupler 35 is disconnected, the urging means 115 still keeps the handle away from the stop 105 in a positive manner whereby the spring 102 provides a positive and rapid closing of the poppet structure and hence of the valve assmbly 20.

The load coupler 35 illustrated in FIG. 10 and described herein is only one exemplary embodiment of a load coupler which may be used to provide a loading operation; and, it is to be understood that any suitable load coupler may be used, provided that it can be coupled into sealing engagement with the adapter flange 22 and has components which can override the spring 102 and move the poppet structure 42 away from its closed position.

In this disclosure of the invention the means supporting the poppet structure during movement thereof along axes 40 and 46 has been described as comprising a cylindrical inside surface 51 provided on the housing 36 and a cylindrical outside surface 53 on the stem 44 of the poppet structure 42 which slideably engages the inside surface 51. However, a modification of this invention is illustrated in FIG. 1A of the drawings and in this modification it will be seen that the valve assembly 20 is provided with an antifriction sleeve 160 carried by the housing part 60 of the housing 36. The antifriction sleeve 160 has an inside cylindrical surface which is also designated by the reference numeral 51 and is particularly adapted to receive the outside surface 53 of the stem 44 thereagainst.

The sleeve 160 is basically in the form of a sleeve bearing made of a suitable antifriction anti-galling plastic material which is compatible with the fluid to be associated therewith. The sleeve 160 has a frustoconical end 161 defined as an integral part thereof which defines an annular shoulder 162. The sleeve 160 may be easily installed in position in a conventional press by relatively moving the housing portion 60 and sleeve 160 until shoulder 162 of sleeve end 161 snaps in position against the annular edge 163 of the integral deflector 64 of housing portion 60. The sleeve 160 has an integral flange 165 at the end thereof opposite end 161 which facilitates installation of such sleeve. The sleeve 160 may also be readily removed in a press and replaced with a new sleeve. Once installed in housing portion 60 the sleeve 160 is basically locked against axial movement by its annular flange 165 and shoulder 162 engaging housing portion 60.

The shape of the end 161 of the sleeve 160 is such that it blends smoothly with the outside surface of the substantially frustoconical deflector 64 and as shown at 166 to thereby allow smooth fluid flow therearound. In addition, the antifriction sleeve 160 helps improve the wear life between the poppet structure 42 and housing part 60 to help increase the overall operating life of the valve assembly 20.

Thus, it is seen that this invention provides a new valve assembly 20 which can be used both as a loading valve and an unloading valve for gasoline tank trucks, or the like. Further, this invention also provides a new method of making such a valve assembly.

While the forms and methods of this invention now preferred have been illustrated and described as required by the Patent Statute, it is to be understood that other forms and method steps can be utilized and still fall within the scope of the appended claims wherein each claim sets forth therein what is believed to be known in the art prior to this invention in that portion of each claim that is presented before the term "the improvement" and sets forth what is believed to be new in the art according to this invention in that portion of each claim that is presented after the term "the improvement" whereby it is believed that each claim sets forth a novel, useful, and unobvious invention within the purview of the Patent Statute.

What is claimed is:

1. In a poppet valve assembly comprising; a housing; a flow passage in said housing; said passage having a central axis and being adapted to flow fluid in either direction therethrough; a poppet structure for controlling fluid flow through said passage; said poppet structure having a head, a cylindrical stem of a particular diameter, and a longitudinal axis which coincides with said central axis; means supporting said poppet structure during movement thereof along said axes; an actuator contact on said poppet structure between said head and said stem to enable movement of said poppet structure along said axes; and means for engaging said contact to provide said movement; the improvement in which said engaging means comprises a shaft carried by said housing for rotary movements thereof and an actuator detachably fastened to said shaft; said shaft and actuator having outer annular surfaces which together define the sole means engaging structural portions associated with said housing to hold said shaft and actuator against movements parallel to a central axis of said shaft while allowing said rotary movements of said shaft to enable said actuator to engage said contact; said engaging means comprising an actuating handle attached to one end of said shaft to provide said rotary movements of said shaft; and said poppet valve assembly further comprising, a stop on said housing for holding said handle in a plurality of open positions, recess means in an inner portion of said handle defining a plurality of holding surfaces on said inner portion which correspond in number to said plurality of open positions, said handle having means yieldingly urging said inner portion and hence said holding surfaces away from said stop whereby once said inner portion with its holding surfaces is urged away from said stop said poppet structure and valve assembly remain normally closed, a pin extending through aligned holes in said handle and in one end of said shaft to attach said handle to said shaft while allowing pivoting movements of said handle about said pin and thereby allow said inner portion of said handle and said holding surfaces to be pivoted away from said stop by said urging means, said urging means comprising spring means and a cooperating hub member carried concentrically around one end of said shaft, said hub member having a tubular end and transverse slot means provided in said tubular end, said hub member being installed on said shaft with said pin extending through said slot means whereby said hub member cannot rotate relative to said shaft, said hub member also having a central hub axis and a first annular surface disposed in a first plane which is perpendicular to said hub axis and a second annular surface disposed in a second plane which is at an angle to said hub axis, and said second annular and angled surface engaging said handle and serving to hold the handle with its holding surfaces away from said stop due to the action of said spring means urging said angled surface against said handle to thereby cause pivoting movement of said inner portion of said handle away from said stop.

2. A poppet valve assembly as set forth in claim 1 in which said spring means comprises a plurality of cupped spring washers.

3. A poppet valve assembly as set forth in claim 2 in which said spring means further comprises a plurality of flat washers cooperating with said spring washers and hub member.

4. A poppet valve assembly as set forth in claim 2 in which said handle is made from a single piece of material.

5. A poppet valve assembly as set forth in claim 1 wherein an operator would normally manually actuate same using said handle so that said handle would be closer to the operator than the remainder of the valve assembly and in the event said operator loses grasp of said handle said angled surface driven by the remainder of said urging means operates to urge the outer portion of said handle away from said operator and thus not tend to whip the operator.

* * * * *